Feb. 23, 1965     K. K. N. CHANG     3,171,087
SOLID-STATE NONRECIPROCAL SIGNAL AMPLIFIER
Filed Feb. 15, 1961     2 Sheets-Sheet 1
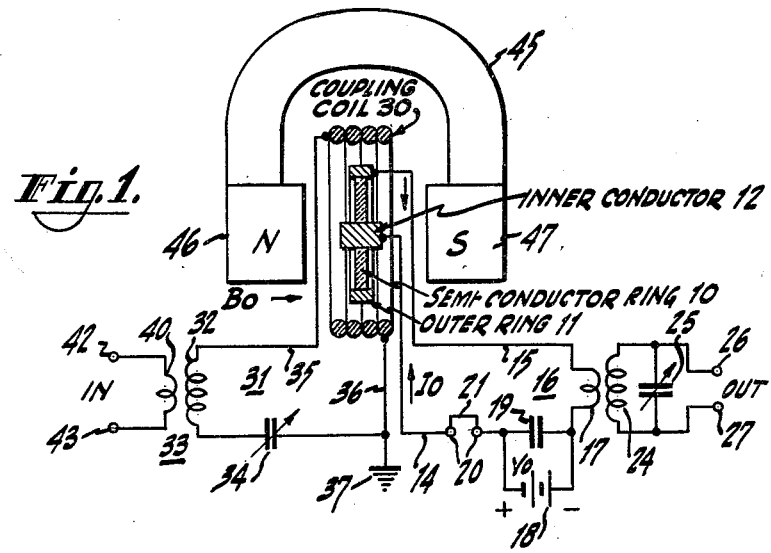
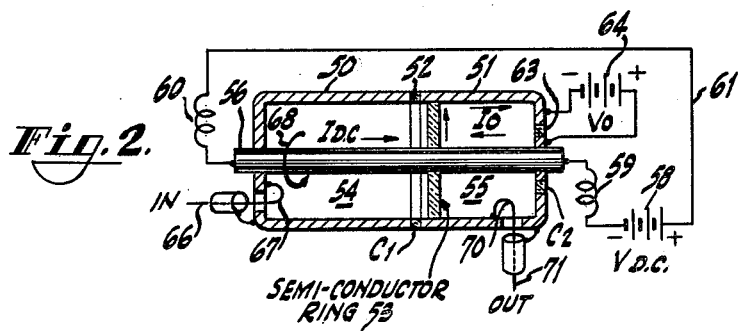
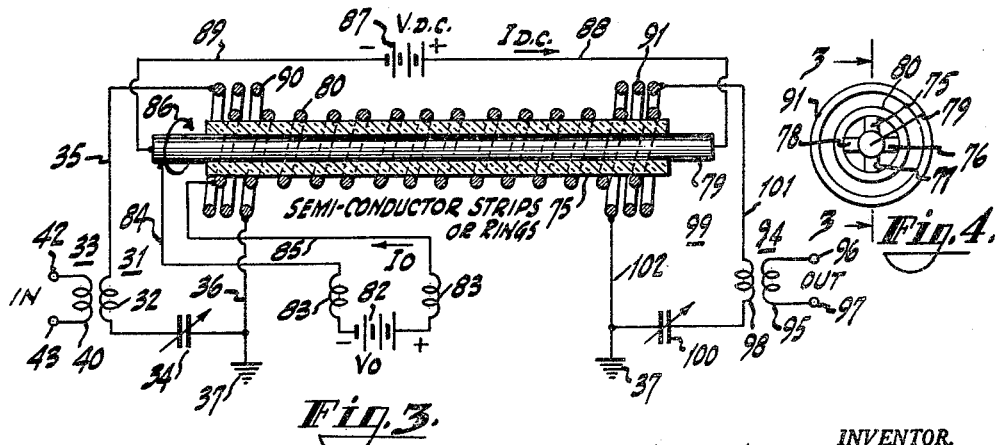
INVENTOR.
KERN K. N. CHANG
BY Eugene M. Whitacre
Attorney Feb. 23, 1965    K. K. N. CHANG    3,171,087
SOLID-STATE NONRECIPROCAL SIGNAL AMPLIFIER
Filed Feb. 15, 1961    2 Sheets-Sheet 2

INVENTOR.
KERN K. N. CHANG
BY Eugene M. Whitacre
Attorney 3,171,087
SOLID-STATE NONRECIPROCAL SIGNAL
AMPLIFIER
Kern K. N. Chang, Princeton, N.J., assignor to Radio
Corporation of America, a corporation of Delaware
Filed Feb. 15, 1961, Ser. No. 89,562
11 Claims. (Cl. 330—60)

The present invention relates to signal amplifiers, and more particularly to nonreciprocal devices which are adapted for use as inter-stage coupling means for such two terminal active devices as tunnel-diode amplifiers, parametric amplifiers, and the like.

There is a present demand for lossless and noiseless nonreciprocal amplifiers for two-terminal and like signal translating devices, such as masers and the amplifier types above mentioned. Presently available ferrite isolators are relatively noisy and have limitations in the frequency of operation. Hall-effect gyrators also have limited application due to their relatively large insertion losses.

It is therefore an object of the present invention to provide a low-loss and relatively-noiseless amplifier or signal translating circuit which is nonreciprocal in operation in a system for signal translation, and which effectively utilizes modulation of the magneto-resistance of a semiconductor element at low as well as high frequencies.

It is also a further object of this invention to provide improved nonreciprocal signal translating means which effectively utilizes the modulation of the magneto-resistance of a semiconductor body for signal amplification or signal mixing or both with relatively simplified circuit means.

It is known that the change in resistivity of a semiconductor body, such as a small relatively thin wafer or ring of antimony, indium arsenide, gallium arsenide, germanium or silicon, among others, is related to the product of the mobility of the current carriers therein and the variation of the applied magnetic field.

Amplifier or signal mixer means in accordance with the invention, provide for effecting resistance variation in signal translating circuits in proportion to variation in the magnetic field applied to a semiconductor element, and for deriving signal amplification or mixing or both in such signal translating circuits. For example, if the magnetic field through the semiconductor element is varied at a radio-frequency rate, the resistance of the element, along a predetermined axis between fixed electrodal elements, is varied proportionally at the same radio-frequency rate. This principle of operation permits amplifier devices of this type to be used at relatively high frequencies as well as low frequencies.

In one embodiment of the invention, a direct current is passed radially through a thin ring or body of magneto-resistive material from a suitable power source of direct current. The resistance of the body is modulated by a signal-responsive magnetic field at a predetermined frequency applied thereto by inductive or magnetic coupling through a coupling coil along the same axis as a fixed biasing magnetic field also applied to the body. The amplified output signal at the frequency of modulation is derived through suitable signal output coupling means connected in circuit with the direct current source from which the energy for amplification is derived.

An amplifier or signal translating system embodying the invention, therefore, includes a semiconductor magneto-resistance device comprising a body of semiconductor material providing a magneto-resistive circuit connection between two conductors or electrodal elements, such as an inner conductor or an outer ring conductor in the case of the embodiment above referred to. To this is added a signal translating circuit connected between the conductors or the electrodal elements, together with means providing a direct-current energy supply source in the connection. Connected with a suitable signal input circuit is means such as a coupling coil, for magnetically modulating the body of semiconductor material to apply energy from the direct current source to an output circuit or output coupling means at the frequency of the carrier wave, which is the input signal frequency in most cases.

In the case of a signal amplifier for a radio signal receiver or the like, a tunable signal input circuit is provided, to which signals to be amplified are applied. A modulating coil or winding is connected for receiving signals in response to the applied signals at the input circuit and is coupled magnetically to, or inductively looped about, a thin wafer-like body of semiconductor material providing the magneto-resistive connection between two conductors along opposite edges thereof to modulate this connection at the signal frequency.

However, the invention is not limited to signal amplification alone but may be used for signal mixing when provision is made for inserting in the output circuit a second signal such as a local oscillator signal, for example. In that case the output signal is a desired intermediate-frequency signal. Such a circuit is therefore useful in radio signal receiver and like systems. As hereinbefore mentioned, it is also useful as an interstage coupling device between tunnel-diode amplifiers and the like to impart a nonreciprocal signal-amplifying characteristic thereto.

A signal translating device in accordance with the invention is also applicable to high-frequency wave-guide equipment and to traveling wave structures. The invention will, however, be further understood from the following description, when considered with reference to the accompanying drawings, and its scope is pointed out in the appended claims.

In the drawings,

FIGURE 1 is a schematic diagram of a solid-state nonreciprocal signal amplifier circuit and circuit elements embodying the invention, and with certain elements in cross-section and on an enlarged scale to better illustrate the construction thereof;

FIGURE 2 is a schematic circuit diagram of a similar signal amplifier of the coaxial wave-guide or cavity type embodying the invention, and also partly in section;

FIGURE 3 is a schematic circuit diagram of a signal amplifier showing an embodiment of the invention as applied to a traveling-wave signal structure, portions of which are shown in cross-section;

FIGURE 4 is an end view of the traveling-wave structure of FIGURE 3 showing further details of its construction in accordance with the invention;

FIGURE 5 is a further schematic circuit diagram of a radio signal receiver provided with an RF signal amplifier embodying the invention, being a modification of the circuit shown in FIGURE 1 and with an element thereof in cross-section;

FIGURE 6 is an end view of the said element of the circuit of FIGURE 5, on an enlarged scale; and FIGURE 7 is a schematic circuit diagram, partly in block form, showing a solid-state intermediate-frequency amplifier provided with inter-stage coupling means in accordance with the invention.

Referring to FIGURE 1 of the drawing, the signal amplifier shown comprises a body 10 of semiconductor material, such as germanium or indium-antimony, in the form of a thin ring about the circumference of which is mounted an outer ring conductor 11 and in the center of which is an inner conductor or plug 12. The inner and outer conductors are connected respectively with leads 14 and 15 of a signal translating or output circuit 16 in which is also connected serially output coupling impedance means 17 and a direct-current source of operating voltage or current $V_0$, provided in the present example by a battery 18 with a shunt signal by-pass capacitor 19. A pair of input terminals 20 with a short-circuiting strip 21 are included serially in the circuit to provide an external signal input connection means therefor. The output coupling impedance means 17 may be the primary winding of an output coupling transformer, the secondary 24 of which is tuned to signal resonance by a suitable shunt capacitor 25 and provided with signal output terminals 26 and 27 to which any suitable utilization means or circuit (not shown) may be connected.

With this circuit arrangement it will be seen that the body or ring of semiconductor material 10 is inserted serially in the signal translating circuit whereby it is in a position to control the current flow from the energy source $V_0$ through the circuit by magneto-resistance action. This action may be provided by a variable magnetic field which may be signal variable at any desired frequency. In the present example the magneto-resistance in the body 10 is modulated by a coupling coil 30 surrounding the magneto-resistance device substantially coaxially therewith as indicated in the figure. The coupling coil and magneto-resistance element are shown in cross-section to better illustrate the construction and coupling arrangement.

The coupling or modulating winding or coil 30 is connected for receiving signal currents in response to applied signals at an input circuit 31. In the present example the input circuit includes the secondary winding 32 of an input coupling transformer 33 and a series variable tuning capacitor 34. Although intermediate amplifier or other coupling elements may be provided, the coupling coil 30 is here connected serially in and forms part of the input circuit 31. To this end the secondary winding 32 is connected through an input circuit lead 35 with the coupling coil and from the coupling coil a second conductor 36 is connected to the tuning capacitor 34. The latter conductor is connected to chassis or common ground 37 for the amplifier whereby the one side of the tuning capacitor 34, such as the rotor element, may be grounded as is the usual practice. Radio-frequency signals are applied to the input circuit through a winding 40 of the input transformer 33 from any signal input circuit (not shown) connected with the terminals 42 and 43 thereof.

A biasing magnetic field is also applied to the semiconductor body or element 10 along the same axis as the variable magnetic field provided by the coupling coil 30. For this purpose a permanent magnet 45 is arranged with its poles or pole pieces 46 and 47 in alignment with the axis of the coupling coil 30 and the semiconductor unit substantially as shown, so that a permanent magnet field $B_0$ is applied at a constant level through the body in the direction indicated by the arrowed line.

The operation of the system is such that an applied radio-frequency signal at the input terminals 42–43 is transferred to the input circuit 31 which is tuned by the variable capacitor 34 for response thereto, whereby signal current flow through the circuit and the coupling coil magnetically modulates the semi-conductor body 10 at the signal frequency. This modulation causes the magneto resistance of the body to vary, thereby providing a variable resistance connection between the conductors 11 and 12 and signal-variable current flow from the power or energy source $V_0$ through the circuit and the output impedance or output coupling element 17. An amplified signal is provided in the circuit 16 which is thus applied to the secondary winding 24 and the output terminals 26–27 when the secondary circuit is tuned by adjustment of the capacitor 25.

The auxiliary input terminals 20 may be connected to any second signal source (not shown), such as a local oscillator, for example, with the shorting link or connector 21 removed to effect signal mixing in the output or signal translating circuit 16. In this case the output or third signal frequency may be the sum or difference of the two signals, such as an intermediate frequency.

The amplifier or signal translating circuit thus operates by variation of the resistivity of the semiconductor body 10, which is substantially proportional to the variation of the magnetic field through the body as provided by the applied modulating signal. When the magnetic field is varied at a radio-frequency rate, the magneto resistance is also varied proportionally at the same radio-frequency rate. Thus there is a signal transfer from the input circuit to the output circuit, with amplification provided by the energy from the direct-current source $V_0$. While a battery is shown in the diagram, this represents any suitable source of direct current energy for use in the amplifier. It was found that the biasing magnetic field of the magnet 45 controlled the sensitivity of the amplifier. The greatest change in resistivity of an indium antimonide semiconductor element 10 with changes in magnetic field due to the coupling coil 30 was found to occur when the biasing magnetic field is about 2,000 to 3,000 gauss. Larger or smaller fields reduced the sensitivity of the system.

Referring now to the modification of the invention shown in FIGURE 2, the wave-guide or coaxial cavity structure is shown in cross-section and comprises outer cylindrical conductor or casing elements 50 and 51 separated by non-conductive ring means 52, and having closed outer ends. The non-conductive ring means 52 serves as a blocking capacitor $C_1$ in the cavity structure. The body of semiconductor material 53 is a relatively thin ring-like partition between two resonant cavities 54 and 55 formed by the conductor elements 50 and 51. An inner rod-like conductor 56 extends through the coaxial cavity structure from end to end as shown, along the axis thereof. A biasing magnetic field in this structure is provided by magnetizing direct current $Idc$ through the inner conductor 56 which is supplied by a current source $Vdc$ represented by a battery 58. The latter is connected through radio-frequency choke coils 59 and 60 with the outer ends of the conductor 56 to provide the circulating magnetizing current $Idc$ along the axis of the cavity structure. The external D.C. circuit is completed through a conductor 61.

A ring of insulating material 63 at the outer end of the cavity 55, surrounding the inner conductor 56, is provided as a stopping capacitor $C_2$ in the cavity structure. The partition 53 of semiconductor material is located on the side of the capacitor $C_1$ toward the chamber 55 and therefore is in contact with the cylindrical outer conductor element 51 of the chamber or cavity 55 and the inner conductor 56. Operating voltage or current for the amplifier is provided by a direct-current source of energy $V_0$ as in the preceding example, and is likewise represented by a battery 64 which is connected between the inner conductor and the outer conductor element 51 of the cavity 55 across the capacitor $C_2$. In this circuit operating current $I_0$ is caused to flow through the inner conductor and radially outwardly through the magneto-resistive body 53 to the outer conductor element 51, and thence back to the source 64 in the direction as indicated by the arrowed lines.

Signals are introduced into the cavity 54 through a shielded coaxial-line input conductor 66 with an internal coupling loop 67, and in a mode to provide magnetic coupling through the ring-like partition or semiconductor element 53 in the same direction as (parallel to) the biasing D.C. magnetic field about the inner conductor 56, which is indicated by the arrowed line 68. Input radio-frequency signals thereby serve to modulate the magneto-resistance of the semiconductor element 53 and thus to vary the operating current $I_0$ in the second cavity 55. This operation sets up magnetic waves in the cavity 55 in a mode which provides signal output coupling through a second internal loop 70 connected with a shielded coaxial-line output conductor 71. The blocking capacitors $C_1$ and $C_2$ serve to isolate the direct-current operating or power supply circuit from the remainder of the cavity structure.

The cavity structure, as shown and described, represents one amplifier application of the invention in the microwave frequency range, for which it is well adapted, since there is theoretically no limit on the operating frequency due to the magneto-resistance modulation.

Referring to the amplifier circuit and travelling wave structure of FIGS. 3 and 4, one or more magneto-resistance or semiconductor elements in the form of elongated strips 75, 76, 77 and 78 are located between a central or axial rod-like conductor 79 and a surrounding helix or helical conductor 80 effectively enclosing the strips 75–78 as indicated more clearly in FIG. 4. One or more of the semiconductor strips may be used or the strip arrangement may be increased in number to provide a continuous cylindrical enclosure or "ring" along the helix. In any case, a semiconductor magneto-resistance body is interposed between the inner or central conductor 79 and the outer helical conductor 80, much like the conductor and semiconductor arrangement in the circuit of FIG. 1.

In the present example, operating voltage or direct-current is provided by the supply source $V_0$ represented by a battery 82. In the present example this is connected through RF choke coils 83 and circuit leads 84–85 with the signal-input end of the helical conductor 80 and the adjacent end of the central conductor 79 as shown. Energizing current $I_0$ then flows, as indicated, from the source $V_0$ through the signal translating circuit comprising the central conductor 79, the semiconductor bodies 75–78 in parallel or radial paths, and the helix or helical conductor 80 progressively. As in the case of the resonant cavity structure of FIG. 2, circular magnetizing current is provided through the central conductor 79 to set up a circumferential biasing magnetic field indicated by the arrowed line 86. This is derived from a direct-current source $Vdc$ provided by a battery 87 connected with the ends of the conductor 79 through supply leads 88 and 89. The steady magnetizing current $Idc$ flows through the circuit in the direction indicated by the arrowed line.

Signals to be amplified are applied to the traveling-wave structure through an input coupling coil 90 which coaxially surrounds and couples with the helix 80 adjacent the signal input end thereof, which is the same end through which energizing current is applied from the battery or direct-current source $V_0$. At the opposite end of the helix 80, a second and similar output coupling coil is provided in coaxial inductive coupling relation therewith, whereby signals may be derived from the traveling-wave structure. The signal input coupling coil 90 may be connected with a tunable input circuit as provided with the circuit of FIG. 1, comprising the input coupling transformer 33 having the primary winding 40 connected with the input terminals 42 and 43. The secondary 32 thereof is included serially in the tunable input circuit 31 with the variable tuning capacitor 34 and the coupling winding 90 through circuit leads 35 and 36, with the latter connected to common or system ground 37.

Likewise, by way of example, a similar circuit may be provided in connection with the output coupling winding or coil 91. This is provided by an output coupling transformer 94 having a secondary winding 95 connected with output terminals 96 and 97. The primary winding 98 is connected serially in a tunable output circuit 99 with a variable tuning capacitor 100 and the coupling winding 91 through circuit leads 101 and 102, the latter being connected to chassis or common ground 97 of the system.

The operation of the traveling wave magneto-resistance amplifier is briefly as follows:

An input radio-frequency signal from any suitable source (not shown) is applied to the input terminals 42–43. The circuit 31 is tuned to resonate with the selected signal which flows through the coupling winding 90 and is thereby coupled inductively or magnetically into the signal input end of the helical winding 80, which is the left-hand end as viewed in the drawing. The radio-frequency magnetic field of the helical conductor or helix is circumferential or in the same direction as the biasing D.C. magnetic field. The reason a circumferential field is set up in the structure of FIGURE 3 rather than an axial field as in the case of FIGURE 1 is because the helix of FIGURE 3 is designed for fast or traveling wave operation whereas the coupling coil 30 of FIGURE 1 is a slow wave structure.

A current wave is thus set up in the strips or body of semiconductor material and in the helix. The longitudinal drift velocity of carriers in the semiconductor or magneto-resistance element or elements is made substantially equal to the phase velocity of current through the helix. Through the traveling-wave structure, reaction is provided essentially between the current wave in the magneto-resistance body and the current wave in the helical conductor.

The input signal from the coupling winding 90 is thus transferred along the helix and applied to the output coupling winding and thence to the output circuit 99 which is tuned to the same frequency. Any suitable utilization circuit or means connected with the terminals 96–97 will receive the amplified signal. Amplification is effected in essentially the same manner as for the preceding embodiments in that the signal-translating circuit, through the conductors 79–80 and the intermediate magneto-resistance body or bodies 75–78, utilizes the energy from the D.C. source $V_0$ to provide the amplification.

Referring now to FIG. 5 and the radio receiver system shown, it will be seen that a magneto-resistance amplifier essentially like that shown in FIG. 1 is provided as a tunable radio-frequency amplifier therefor. For this reason the corresponding circuit elements are provided with the same reference numerals as used in FIG. 1, and operate in the same manner. The overall receiver or signal receiving system otherwise represents any conventional receiver having for example, a signal mixer 105 followed by an intermediate-frequency amplifier 106, a second or audio-frequency detector 107, an audio-frequency amplifier 108, and output loudspeaker or other utilization means 109.

The magneto-resistance radio-frequency amplifier embodying the invention is connected at its input terminals 42 and 43 with suitable signal supply means such as a signal receiving antenna 110 and ground connecting means 111. The terminal 43 is connected through a lead 112 with chassis or common ground 37 for the receiver or system. The input coupling transformer 33 is provided with the primary winding 40 which is connected to the input terminals 42 and 43. The transformer secondary winding 32 is connected in the tunable input circuit 31 in series with the variable tuning capacitor 34 and a coupling or modulating winding 114 through circuit leads 35 and 36. The tuning capacitor serves to select signals from the input circuit connections with the antenna system of the present example for modulating a magneto-resistance device in the amplifier through the coupling winding 114. A magneto-resistance device, for use in the receiver radio-frequency amplifier of the type shown, may be relatively small as indicated in FIG. 5 and by way of example, having dimensions as shown in the enlarged end view in FIG. 6, to which attention is directed, along with FIG. 5.

The body of semiconductor material 115 of the said device may be in the form of a thin rectangular plate or wafer between two edge-contacting electrodal elements or conductors 116 and 117, substantially as shown. These may be firmly attached to opposite edges by plating or other suitable means. The conductor 116 is connected with conduit leads 15 and conductor 117 with circuit leads 14a and 14b for the signal-translating or output circuit 16 which includes output terminals 118 and a power source $V_0$ of direct current, represented by the battery 18, and provided with the signal or RF bypass capacitor 19. It will be noted that the conductor 14a–14b of the signal-translating or output circuit is connected to the ground lead 112, whereby one end side of this circuit is connected to system ground or chassis. Likewise the input circuit 31 is connected to system ground or chassis 37 through a connection lead 120 in the present example.

The biasing magnetic field $B_0$ is provided by an electromagnet, as in the preceding example of FIG. 1, having poles 46 and 47 aligned with the semiconductor body 115 to provide a fixed biasing magnetic field through the body in the direction of the arrowed line. The coupling winding 114 is coaxial with the axis of the fixed magnetic field and relatively closely magnetically coupled to the plate 115 of semiconductor material. Signal variations thus serve to modulate the magneto-resistance of the body 115 between the conductors 116 and 117 and provide an output signal at the terminals 118 amplified by the energy derived from the source $V_0$ due to the operating direct current $I_0$ flowing through the circuit, as indicated by the arrowed lines.

Since the input signals applied to the amplifier are at radio frequencies, the output signals at the terminals 118 are likewise at the same radio frequencies. These signals may be applied to the mixer 105 through any suitable RF coupling means such as the output transformer as shown in FIG. 1. This comprises the primary winding 17 connected with the output terminals 118 of the signal-translating circuit, and coupled to the secondary 24 which in turn is tuned to a selected signal by the variable shunt tuning capacitor 25. The terminals 26 and 27 of the secondary circuit are connected to signal input side of the mixer 105 as indicated. The terminal 27 is also connected through a connection lead 122 with common or system ground 37 as shown.

Referring now to FIG. 7, a three-stage tunnel-diode intermediate-frequency amplifier is shown by way of example to illustrate one use for a magneto-resistance amplifier embodying the invention to improve the operation thereof. Such amplifiers require interstage nonreciprocal coupling means for best or effective use in a signal translating system, such as a radio receiver for example. An amplifier circuit in accordance with the invention may be used effectively therein as such coupling means as will be seen from a consideration of the circuit of FIG. 7.

The intermediate-frequency amplifier of the present example, for use in a radio signal receiving system or the like, includes three tunnel-diode amplifier stages 125, 126 and 127 connected in cascade relation between an intermediate-frequency signal input circuit 128 and an intermediate frequency signal output circuit 129. Signal amplification is attained effectively with the tunnel diode amplifier but subject however to signal translation or coupling in either direction. Accordingly, between the first stage 125 and the second stage 126 a magneto-resistance amplifier 130 in accordance with the invention is connected as an interstage coupling means, and likewise between the second stage 126 and the third stage 127 a second magneto-resistance amplifier 131 in accordance with the invention is provided as the interstage coupling means therefor. Since both magneto-resistance amplifiers may be alike in construction and circuit arrangement, the internal circuitry and elements of the amplifier 130 alone are shown in detail.

From an inspection of circuitry of the amplifier 130 it will be seen that it follows closely the construction of the radio-frequency amplifier in the RF signal circuit of FIG. 5, except that it is designed for a fixed intermediate-frequency signal rather than for variable RF signal response. The specific circuit includes an intermediate-frequency input coupling transformer 134 having a primary winding 135 connected with input terminals 136, which are connected with output terminals 137 of the first intermediate-frequency amplifier stage 125. A secondary winding 138 of the input transformer is connected serially through a fixed tuning capacitor 139 and a magneto-resistance coupling coil 140 to provide a series secondary circuit 141 which is tuned to resonance at the selected intermediate frequency by any suitable means, such as a conventional movable ferrite or like core element 141 for the secondary winding 138.

The modulator or coupling winding 140 is inductively or magnetically coupled, as in the preceding examples, with a body of magneto-resistance or semiconductor material 143 for controlling, by magneto-resistance variation, the flow of signal translating currents between two spaced conductors 144 and 145 on the body and connected in a signal translating or output circuit 146 through circuit conductors 147 and 148, the latter being connected to chassis or system ground 149 for the amplifier.

The conductor 148 is connected to an output terminal 150 through a bypass capacitor 151 for a direct-current power or operating voltage source ($V_0$) represented by the two direct current supply terminals 152 therefor. The present circuit also includes choke-coil elements 153 further isolating the direct-current power supply connection at the terminals 152 from the signal translating circuit. A second output terminal 155, connected with the circuit lead 147 from the magneto-resistance device, completes the internal circuitry of the amplifier. The direct-current signal translating circuit 146 is completed externally through connection of the output terminals 150 and 155 with the input terminals 156 and 157 of the second stage and internal direct-current-conductive coupling means, such as a winding 158 of a transformer of like coupling element therein. In any case, the output or signal translating circuit 146 is a direct-current-conductive circuit, as is understood.

For the purpose of simplifying the drawing, the fixed magnetic field means for the magneto-resistance element 143 is omitted from FIG. 7. However, the arrangement is in detail the same as for the element and the magnetic field is as provided in the circuit of FIG. 5, except that this amplifier of FIG. 7 operates at an intermediate or fixed frequency. The operation for signal amplification is the same as that described for the amplifier of FIG. 5 except for frequency, and need not further be described. The second inter-stage amplifier or coupling means 131 is likewise the same as the first and provides nonreciprocal coupling between stages in the same manner as the first.

The present intermediate-frequency amplifier may therefore be entirely of the solid-state type and utilize the advantages of tunnel-diode amplification both in cost and simplicity for high frequency signals, while at the same time being effectively nonreciprocal through the use of the inter-stage magneto-resistance coupling means embodying the invention as described.

It will be seen that lossless and substantially noiseless nonreciprocal amplifier and like circuits for use in both low and high-frequency signal translating systems may be provided by the circuits as herein described embodying the invention. The novel, nonreciprocal amplifier system utilizing the modulation of magneto-resistance semiconductor elements of relatively small size between spaced conductor or electrodal elements may take suitable form for adaption to various signal systems as shown by the examples herein. The system in accordance with the invention, provides a practical means, substantially free of frequency limitations, for attaining a relatively high degree of signal amplification by magneto-resistance modulation.

What is claimed is:

1. A solid-state signal amplifier comprising in combination, a pair of coaxial conductor elements, a body of semiconductor material connected between said conductor elements, a signal translating circuit connected with said conductor elements, means for connecting a direct-current supply source between said conductor elements to apply an electric field radially through said body of semiconductor material, and means for magnetically modulating the body of semiconductor material to apply energy from said source to said signal translating circuit at a selected signal frequency.

2. A solid-state signal amplifier as defined in claim 1, wherein the conductor elements and body of semiconductor material are mounted substantially on a common axis in a biasing magnetic field directed through said body along said axis, and wherein the means for modulating the body of semiconductor material includes a modulating winding magnetically coupled with said body along said axis and a signal supply circuit therefor.

3. A solid-state signal amplifier as defined in claim 1, wherein the body of semiconductor material is a ring-like partition between two resonant cavities formed by the conductor elements, and wherein the magnetic modulating means includes one cavity connected for signal wave input in one mode and magnetic translation through said body of semiconductor material.

4. A solid-state signal amplifier as defined in claim 1, wherein one conductor element is a central rod and the other conductor element is a coaxial helix with the body of semiconductor material extending axially along and between said conductor element, and wherein the drift velocity of the carrier in the body is substantially equal to the phase velocity of the helix, thereby to provide effectively a traveling-wave structure in which the reaction is essentially between the current wave in the body and the current wave in the helix.

5. A signal amplifier comprising in combination, first and second coaxial conductors, a plate of semiconductor material having an inner edge connected to said first conductor and an outer edge connected to said second conductor, a signal translating circuit connected between said conductors, means providing a direct-current energy supply source connected to apply an electric field radially through said plate of semiconductor material, means for magnetically modulating said body of semiconductor material to apply energy from said source to said signal translating circuit at the frequency of modulation and thereby amplify applied signals, and means including a signal input circuit for applying signals to be amplified to said modulating means.

6. A signal amplifier comprising in combination a pair of coaxial conductor elements, a body of semiconductor material connected between said conductor elements, a signal translating circuit connected with said conductor elements, means for coupling a direct-current supply source to apply an electric field through said body of semiconductor material, means for magnetically modulating the body of semiconductor material at a selected signal frequency to apply current from said source to said signal translating circuit at said frequency, means connected with said signal-translating circuit for applying signal energy thereto at a different frequency from the said signal frequency, and means coupled with said signal translating circuit for deriving therefrom a resultant signal at a third frequency.

7. A nonreciprocal signal amplifier comprising in combination, means providing a tuned signal input circuit, means providing a substantially fixed magnetic field along a predetermined axis, first and second coaxial conductors, a body of semiconductor material connected between said conductors across said magnetic field, a signal translating circuit connected between said conductors, means providing a direct-current energy supply source in series with said signal translating circuit to apply an electrical field radially through said body of semiconductor material, and means including an inductive coupling element connected with said input circuit for magnetically modulating the body of semiconductor material in a direction along said axis and varying the resistance between said conductors to apply energy from said source to said output circuit at the signal frequency.

8. A signal amplifier comprising in combination, means providing a signal input circuit including a modulating windng as an element thereof, first and second coaxial conductor elements, a body of semiconductor material in the magnetic field of said winding providing a signal-responsive magneto-resistive circuit connection between said conductor elements, a direct-current-conducting signal-translating circuit connected between said conductor elements and including signal output coupling means, and means providing a direct-current energy supply source in said signal-translating circuit to apply an electric field between said conductor elements, whereby the resistive connection between said conductor elements is varied in response to applied signals at said input circuit thereby to apply signal energy from said source through said signal-translating circuit to said output coupling means at the signal frequency.

9. A nonreciprocal signal amplifier comprising in combination, means providing a signal input circuit, a modulating winding connected for receiving signal currents in response to applied signals at said input circuit, a first conductor and a second conductor in spaced relation, a rectangular wafer of semiconductor material providing a magneto-resistive edge-to-edge current path between said conductors, a signal-translating circuit providing a direct-current-conductive connection between said conductors and including said current path, means for applying a biasing magnetic field to said wafer of semiconductor material on an axis across said resistive current path therethrough between said conductors, means providing a direct-current energy supply source for said signal-translating circuit, said modulating winding being relatively-closely magnetically coupled to said wafer of semiconductor material on the same axis as the biasing magnetic field to effectively vary the resistance of said current path and apply output signal energy from said source to said signal-translating circuit at the signal frequency, and means providing a signal output circuit coupled to said signal-translating circuit.

10. A nonreciprocal signal amplifier as defined in claim 9, wherein the signal translating circuit is adapted to receive a signal at a different frequency from the signal frequency for effecting signal mixing therein.

11. A nonreciprocal signal amplifier comprising in combination, a direct-current-conductive signal translating circuit having a direct-current energy supply connection and a pair of series-related conductor elements in spaced relation therein, a rectangular wafer-like body of semiconductor material connected along two opposite sides between said conductor elements and thereby providing a magneto-resistive current path between said elements and in said circuit, means including a coupling coil surrounding and relatively-closely magnetically coupled to said body of semiconductor material along an axis at an angle to said current path for applying an input signal to magnetically modulate said body and vary said magneto-resistive current path at the signal frequency thereby to apply output energy from said supply connection to said signal translating circuit at said signal frequency, means for applying a biasing magnetic field to said body of semiconductor material along said axis, and means coupled with said circuit for deriving therefrom an output signal at said signal frequency.

References Cited in the file of this patent

UNITED STATES PATENTS

| | | |
|---|---|---|
| 2,500,953 | Libman | Mar. 21, 1950 |
| 2,736,858 | Welker | Feb. 28, 1956 |
| 2,752,434 | Dunlap | June 26, 1956 |
| 2,828,396 | Forman et al. | Mar. 25, 1958 |